United States Patent
Liao et al.

(10) Patent No.: US 11,036,296 B2
(45) Date of Patent: Jun. 15, 2021

(54) ELECTRONIC DEVICE AND CONTROL METHOD THEREOF

(71) Applicant: Lenovo (Beijing) Co., Ltd., Beijing (CN)

(72) Inventors: Super Liao, Beijing (CN); Li Jiang, Beijing (CN); Zhenghong Chen, Beijing (CN); Shuisheng Yu, Beijing (CN); Guangbo Meng, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/238,480

(22) Filed: Jan. 2, 2019

(65) Prior Publication Data

US 2019/0204923 A1 Jul. 4, 2019

(30) Foreign Application Priority Data

Jan. 2, 2018 (CN) .......................... 201810001537.8

(51) Int. Cl.
*G06F 3/01* (2006.01)
*G02B 27/01* (2006.01)

(52) U.S. Cl.
CPC ......... *G06F 3/016* (2013.01); *G02B 27/0176* (2013.01); *G06F 3/014* (2013.01); *G06F 2203/012* (2013.01); *G06F 2203/014* (2013.01)

(58) Field of Classification Search
CPC .... G06F 3/016; G06F 3/014; G06F 2203/012; G06F 2203/014; G02B 27/0176
See application file for complete search history.

(56) References Cited

U.S. PATENT DOCUMENTS

| | | | | |
|---|---|---|---|---|
| 2003/0234823 | A1* | 12/2003 | Sato | G06F 3/013 715/848 |
| 2009/0306741 | A1* | 12/2009 | Hogle | A61N 1/36103 607/54 |
| 2012/0029399 | A1* | 2/2012 | Sankai | A61H 1/0288 601/40 |
| 2014/0184496 | A1* | 7/2014 | Gribetz | G02B 27/017 345/156 |
| 2014/0184520 | A1 | 7/2014 | Zhang et al. | |
| 2015/0293592 | A1* | 10/2015 | Cheong | G06F 3/04886 345/173 |
| 2016/0054798 | A1* | 2/2016 | Messingher | G06T 19/006 345/156 |

FOREIGN PATENT DOCUMENTS

| | | |
|---|---|---|
| CN | 105388995 A | 3/2016 |
| CN | 105473021 A | 4/2016 |
| CN | 106575159 A | 4/2017 |

* cited by examiner

*Primary Examiner* — Shaheda A Abdin
(74) *Attorney, Agent, or Firm* — Anova Law Group, PLLC

(57) ABSTRACT

An electronic device includes a fixing device and an output device. The fixing device is provided for, after the electronic device is worn by the user, maintaining a relative positional relationship between the electronic device and the at least one part of the user's body. The output device is provided for, after the electronic device is worn by the user, responding to an obtained control command and performing an operation causing the user to receive haptic feedback from the electronic device based on the relative positional relationship.

16 Claims, 6 Drawing Sheets

ELECTRONIC DEVICE AND CONTROL METHOD THEREOF

CROSS-REFERENCES TO RELATED APPLICATIONS

This application claims priority of Chinese Patent Application No. 201810001537.8, filed on Jan. 2, 2018, the entire contents of which are hereby incorporated by reference.

FIELD OF THE INVENTION

The present disclosure generally relates to the field of virtual reality technology and, more particularly, relates to an electronic device and its control method.

BACKGROUND

Virtual Reality (VR) technology is a new man-machine interface technology in the Internet era. It creates a three-dimensional virtual environment with the help of VR equipment, and interacts with the virtual environment through motion, facial expression, voice, gesture, sight and so on, so that users can have an immersive experience.

Currently, VR equipment on the market is usually based on the state of the user wearing a virtual display device to generate corresponding commands, so as to control a virtual scene outputted by the virtual reality device and the state changes of the virtual characters it contains, and to allow the user to see the state changes directly, thereby realizing the user's immersion.

However, when wearing of the virtual reality device, the user often can only visually and intuitively perceive the virtual scene, which is limited to a single format and reduces the timeliness of users' feedback on the virtual scene, thereby affecting the user's immersion in the virtual scene.

The disclosed methods and systems are directed to solve one or more problems set forth above and other problems.

BRIEF SUMMARY OF THE DISCLOSURE

One aspect of the present disclosure provides an electronic device. The electronic device includes a fixing device and an output device. The fixing device is provided for, after the electronic device is worn by the user, maintaining a relative positional relationship between the electronic device and the at least one part of the user's body. The output device is provided for, after the electronic device is worn by the user, responding to an obtained control command and performing an operation causing the user to receive haptic feedback from the electronic device based on the relative positional relationship.

Another aspect of the present disclosure provides a control method for an electronic device worn by a user. The electronic device contains a fixing device and an output device. The control method includes, after the electronic device is worn by the user, maintaining, by the fixing device, a relative positional relationship between the electronic device and the at least one part of the user's body. The control method also includes, after the electronic device is worn by the user, responding, by the output device, to an obtained control command and performing an operation causing the user to receive haptic feedback from the electronic device based on the relative positional relationship.

Other aspects of the present disclosure can be understood by those skilled in the art in light of the description, the claims, and the drawings of the present disclosure.

BRIEF DESCRIPTION OF THE DRAWINGS

In order to more clearly illustrate the technical solutions of this disclosure, the accompanying drawings will be briefly introduced below. Obviously, the drawings are only part of the disclosed embodiments. Those skilled in the art can derive other drawings from the disclosed drawings without creative efforts.

DETAILED DESCRIPTION

The technical solutions of the present disclosure will be described below together with the accompanying drawings. Obviously, the described embodiments are only part of, not all of, the embodiments of this disclosure. Based on the disclosed embodiments, other embodiments obtained by those skilled in the art without creative efforts are within the protection scope of this disclosure.

Figure 1:
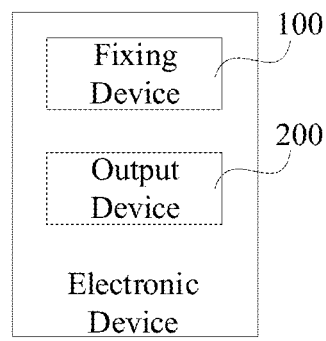
FIG. 1 illustrates a schematic diagram of an electronic device consistent with the disclosed embodiments.

FIG. 1 shows a schematic diagram of an electronic device consistent with the disclosed embodiments. As shown in FIG. 1, the electronic device may include a fixing device 100 and an output device 200, etc.

When the user is wearing the electronic device, the fixing device 100 may be used to maintain the relative positional relationship between the electronic device and the at least one part of the user's body. In practical applications, when the user needs to wear the electronic device to feel the virtual scene presented by the electronic device, the electronic device can be worn on a corresponding body part, and the relative positional relationship between the electronic device and the user's body part can be maintained by the fixing device of the electronic device.

Thus, the body parts that need to maintain the relative positional relationship with the electronic device are different when the wearing manner of the electronic device is different. Accordingly, the specific structures of the fixing devices 100 are different as well. For example, when the electronic device is worn on different body parts such as the wrist, the hand, the head, and other different body parts, the fixing device can determine the structure, shape, and fixing manner of the fixing device 100 according to the shape, wearing manner and the like of the corresponding body part, such as a glove shape, a spectacles shape, a helmet shape and the like. The specific structure of the fixing device 100 is not limited herein.

The output device 200 is used to, after the electronic device is worn by the user, respond to the control command and perform an operation causing the user to obtain the haptic feedback.

Figure 2:
FIG. 2 illustrates a schematic diagram of the usage of an electronic device consistent with the disclosed embodiments.

In one embodiment, after the electronic device is worn by the user, referring to FIG. 2, the electronic device can output a virtual scene and present the virtual scene in front of the user, so that the user can intuitively experience the virtual scene visually. However, unlike when the user uses an existing electronic device to interact with, where the user can only visually experience the change of the virtual scene, the disclosed electronic device can combine the haptic perception to generate feedback in the virtual scene. Haptic perception may refer to the feelings of nerve cells distributed on the skin of the whole body that obtain perceptions of temperature, humidity, pain, pressure, vibration, and the like from the external environment. The user can perform positioning by the obtained haptic feedback.

For example, when the user wears an electronic device to play a fighting game, the electronic device can create a virtual fighting game scene and display the scene in front of the user according to the user's viewing angle. During the game, if the user's virtual character such as the back of user's head is hit by other game characters or objects, the output device 200 of the electronic device may perform a feedback operation to cause the back of the user's head to experience vibration and pain. When the user's virtual character enters a small space, the output device 200 can reduce or shrink the space, thereby making the user's body experience pressure or oppression. When the user's virtual character picks up a weapon, the output device can cause the user to obtain the haptic feedback of gripping an object and the like. Other scenarios may also be used.

Thus, according to different virtual scenes and/or different interactions of the user's virtual character in the virtual scene, etc., the output device can perform operations causing the user to obtain corresponding haptic feedback, enriching the forms of operation of the electronic device, and further improving the user's immersive experience in the virtual scene.

Optionally, in one embodiment, the output device 200 may include the at least one type of haptic components capable of receiving haptic feedback from multiple body positions of the user.

For example, for different types of haptic feedback, haptic components can be divided into various types such as temperature components, vibration components, pain components, itching components, pressure components and the like. For these types of haptic components, through corresponding sensors or change of the mechanical structures and the like, the user can experience the corresponding haptic feedback. The present disclosure does not intend to limit the types of the haptic components included in the output device, such as the number, mounting position, deformation mode, or material of each data/haptic component.

In practical applications, using the vibrations of multiple body positions as an example, the meaning or function represented by the obtained haptic feedback in the user's different body positions can be set in advance. For example, when the left side of a virtual scene (i.e., the left side of the user's virtual character) outputs a prompt message, the output device can cause the user to experience vibration on the body part such as the left hand or the left side of the head. When the right side of the virtual scene (i.e., the right side of the user's virtual character) outputs a prompt message, the output device can cause the user to experience vibration on the body part such as the right hand or the right side of the head.

Alternatively, when the virtual scene presented in front of the user changes, the output device may also perform an operation to cause the user to experience vibration on a certain body part to remind the user that the virtual scene has changed. Or, as described above, due to the user's interaction, the output device may cause the at least one specific part of the user's body to experience the vibration or the like. Other examples may also be used, which can be set based on the structure of the output device and the requirement of different virtual scenes.

Figure 3:
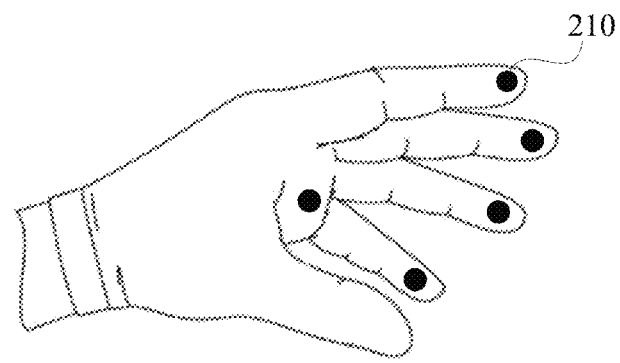
FIG. 3 illustrates a structural diagram of a data glove electronic device consistent with the disclosed embodiments.
Figure 4:
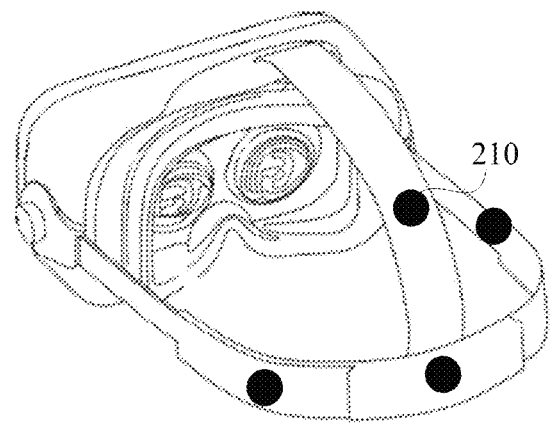
FIG. 4 illustrates a structural diagram of a helmet electronic device consistent with the disclosed embodiments.

In one embodiment, referring to the electronic device shown in FIG. 3 and FIG. 4, the at least one type of the haptic components described above may include a plurality of first haptic components 210 (black dots shown in FIG. 3 and FIG. 4) disposed in different positions. The plurality of first haptic components 210 may be the same type or different types of haptic components.

That is, in one embodiment, the plurality of first haptic components 210 can be fixedly mounted in different positions of the output device, so that at the same time, a plurality of the user's body parts can obtain the same or different haptic feedback, thereby increasing the control flexibility and diversity of the output device, as well as causing the user to obtain richer haptic feedback.

For example, the virtual scene outputted by an electronic device is a snow scene. When the user touches the snow by hand (at least a plurality of fingers), the temperature component set on the user's hand can be controlled to respond to the control command, so that the user's hand feels the cold. The temperature on the user's hand and/or the surrounding temperature can actually be lowered by the plurality of temperature components, so that the user's hand touches the multiple positions corresponding to the virtual snow to experience the coldness. Thus, the user's feeling of coldness in the real snow scene in the virtual snow scene can be improved.

Of course, the plurality of first haptic components can also be activated in sequence, so that the user obtains changing haptic feedback. Such details can be determined according to the scene requirements.

In another embodiment, the at least one type of haptic components described above may include second haptic components 220 capable of moving relative to the at least one part of the user's body. The number of such second haptic components is not limited.

Figure 5:
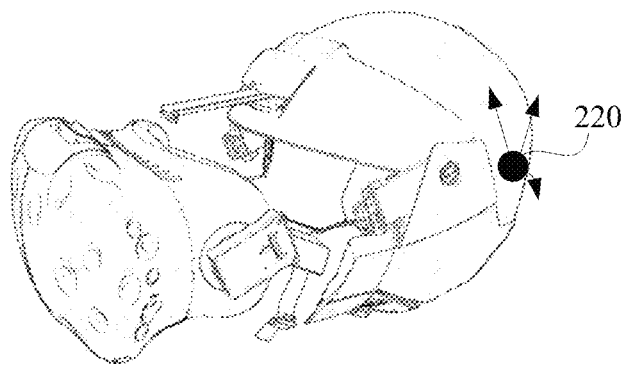
FIG. 5 illustrates a structural diagram of another helmet electronic device consistent with the disclosed embodiments.

Referring to the head-mounted electronic device shown in FIG. 5, the second haptic component 220 can move along the helmet according to the preset rules, so that the user's multiple body positions successively obtain the haptic feedback. Thus the feeling that the user should have in the real environment corresponding to a virtual scene is simulated.

Further, the at least one type of haptic components may include a third haptic component that makes the user obtain the haptic feedback in the corresponding body position while moving relative to the at least one part of the user's body. Compared with the second haptic component described above, the third haptic component also contains haptic prompt functions.

The head-mounted electronic device shown in FIG. 5 is still used as an example. If, in the current virtual scene, the head of the virtual character of the user is cut by a knife, the third haptic component, capable of moving in the corresponding position and generating a pain feeling, can be controlled to respond to the control command to move relative to the user's head according to a corresponding moving track. At the same time, the third haptic component interacts with the user's head relative to the position of the movement, so that the user's head experiences the pain in the corresponding position of the moving track. That is, in one embodiment, using the movement of the third haptic component causing the user's feeling of pain, the virtual scene of the head of the virtual character of the user being cut by a knife can be simulated.

Referring to the description of the working process of the third haptic component described above, the third haptic components may also be other types of haptic components, or different types of haptic components acting on other parts of the user's body. For example, by controlling the movement of the third haptic component capable of generating a low temperature perception, a virtual scene in which the user's virtual human head (or other body part) is slid by a low temperature object may be simulated. By controlling the third haptic component to radiantly move downward from the top of the user's head while lowering the surrounding temperature so that the user's head feels the movement of cold air, a virtual scene where the user's virtual character is drenched from the head by cold water or is blown down from the head by cold air and the like may be simulated. Various other moving haptic feedback can be simulated by referring to the above specific examples in combination with specific virtual scenes.

Figure 6:
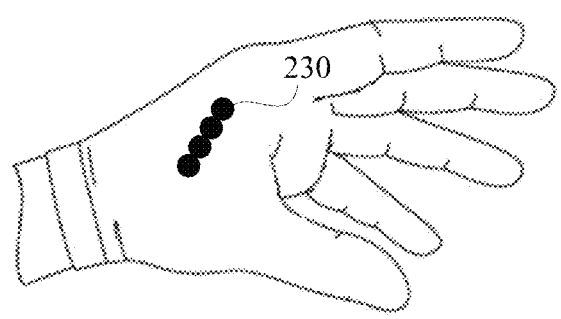
FIG. 6 illustrates a structural diagram of another data glove electronic device consistent with the disclosed embodiments.

In another embodiment, the at least one type of haptic components described above may comprise a plurality of fourth haptic components that allow different positions of the user's body obtain the haptic feedback sequentially according to the acquired preset rule. The plurality of fourth haptic components can be of the same type, thereby achieving the simulation effect of the third haptic component described above by the plurality of fourth haptic components. That is, by controlling the plurality of fourth haptic components located on the determined moving track to start operation sequentially along the moving direction so that the corresponding parts of the user's body obtain the haptic feedback sequentially, the virtual scenes such as knife cutting (as shown in FIG. 6, the plurality of fourth haptic components 230 are sequentially activated), low temperature sliding, drench of cold water and the like may be simulated.

The preset rules described above can be determined according to the state information generated by the user interaction in the actual virtual scene, such as the virtual object/person's moving track.

Accordingly, various virtual scenes causing the user's body parts to obtain moving haptic feedback can be realized by controlling the third haptic components described above that can move relative to the body parts while acting on the corresponding positions of the body. A plurality of fourth haptic components acting on the user's corresponding body parts may also be controlled to start operation sequentially to simulate the same virtual scenes, thereby improving the flexibility and diversity of the structure of the output device.

In addition, it should be noted that, for the output device disclosed in the above embodiment that may cause a plurality of the user's body positions to obtain the haptic feedback, the haptic feedback may be obtained sequentially in the plurality of the body positions as described in the above embodiment. The haptic feedback may also be obtained simultaneously in the plurality of the body positions. The control of corresponding haptic components may be realized according to the specific scene requirements. In addition, in the case that the output device comprises a plurality of haptic components, the plurality of the user's body parts may experience the haptic feedback in both ways successively.

Using the virtual scene that simulates knife cutting the user as an example, the output device may include a plurality of first haptic components, which may be the pain haptic components whose specific structures are not limited herein. Based on this, the plurality of first haptic components can be controlled to sequentially perform an operation causing the user to obtain pain feelings. Thus, the plurality of first haptic components can make the user experience the process of knife cutting through. Then the first haptic components can be controlled to work simultaneously, causing the user to obtain the experience of sustained pain in the wound.

Optionally, during the operation of the plurality of first haptic components, the control parameters of the first haptic components may be different. The control parameters between the first haptic components may also be different during each operation. For example, the first several first haptic components have a larger control range during the sequential operations, while the latter several first haptic components have a smaller control range, indicating that the painful position is moving at the time of knife cutting. The control parameters of the plurality of first haptic components are the same during the subsequent control processes performing operations simultaneously, indicating the same pain perception in all positions at the end. In addition, for the haptic component capable of moving relative to the user's body, the control parameters may be dynamically changed. That is, during the operation of the haptic components, the control parameters may be changed so that the control amplitude is dynamically changed. The change of pain perception during the above knife cutting process can be simulated as well, details of which are omitted herein.

Optionally, the output device 200 disclosed in one embodiment may comprise the at least one fifth haptic component causing the user to obtain non-moving or vibrational haptic feedback. The fifth haptic component may be used to simulate the user's perception of high/low temperature in a fixed position, an electric shock, or a puncture and the like.

Figure 7:
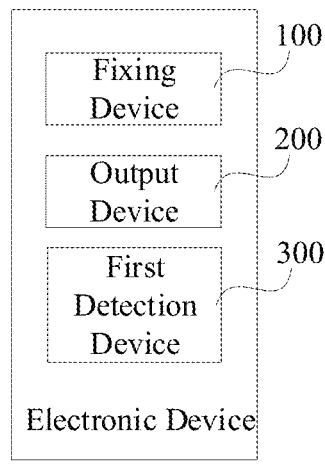
FIG. 7 illustrates schematic diagram of another electronic device consistent with the disclosed embodiments.

In this case, as shown in FIG. 7, the electronic device may further include a first detecting device 300, used to detect the attribute information of the contact area of the output device 200 contacting the at least one part of the user's body. The attribute information can be used to indicate the control command obtained by the output device 200 for the fifth haptic component in a corresponding position.

In a practical application, when the output device acts on the at least one body part of the user, the body parts of the user have different body feeling requirements. For example, for a skin area covered by hair and a bare skin area, when the same kind of haptic feedback is applied to these two areas, if the control parameters of the haptic component are the same, the haptic feedback in the hair area is weaker or even cannot be obtained due to the blocking of the hair.

In order to prevent the blocking by the hair described above to cause weak body feeling, the attribute information of the contact area between the fifth haptic component and the user's body can be directly detected by the first detecting device 300 to determine whether it is a bare skin area, a hair area, a clothing covering area, or the like. The control parameters of the second haptic components, such as the strength/amplitude, the angle, and the like acting on this contact area can be adjusted accordingly so as to ensure that the user obtains substantially the same body feeling.

Optionally, the first detecting device 300 may include a photodetector that emits light to the contact area. By detecting parameters of the reflected light, it can be determined of preset area the contact area belongs to can be determined. Of course the image information of the contact area may also be obtained by an image collector. The attribute of the contact area or the type of the preset area may be determined by analyzing the image information collected by the image collector. The specific structure, result, and the detection manner of the first detecting device 300 are not limited herein. The attribute information described above may be determined based on the detection manner of the first detecting device 300. The preset attribute and the like corresponding to the contact area may also be determined based on the detection results. The content of the attribute information is not limited herein.

Optionally, the output device 200 disclosed in one embodiment may have the at least one preset shape. After the electronic device is worn by the user, the output device in the preset shape can cause the user to obtain spatial haptic feedback. In practical applications, the output device can control the shape, the space size, changes and the like of the electronic device perceived by the user, enriching the user's physical feeling of the virtual scene.

Specifically, the output device 200 may have the at least one fixed shape that can be derived from an initial shape change of the output device. Using the electronic device of helmet shown in the FIG. 4 as an example, after wearing the helmet, the user may reduce the size of the helmet according to the scene requirements and lock the size of helmet to a certain degree, so that the user may get a physical feeling of being in a compacted scene. The change of the spatial size of the electronic device can be realized by changing the mechanical structure of the electronic device. The specific implementation method is not limited herein.

In one embodiment, the final-locked fixed shape of the output device 200 may not be changed in the subsequent processes. The fixed shape may be determined based on the factors such the specific shape of the electronic device, the shape of the body part that needs to feel the compression experience and the like. The specific content of the fixed shape is not limited herein.

Optionally, in one embodiment, the output device 200 may also perform the shape change between the preset first fixed position and the second fixed position. The output device 200 can be locked in a fixed position (i.e., the preset first fixed position) as needed to prohibit to continue the shape change in the same direction, but allows the shape change in the opposite direction so that the other fixed position (i.e., the preset second fixed position) is reached.

Using the data glove shown in FIG. 3 as an example, after the user puts on the data glove, if the user in the current virtual scene performs a tug-of-war game with other virtual characters, the user needs to hold the rope or stick. Based on the thickness of the rope or stick, the position of the data glove from the initial position that shows the scene of gripping the rope or stick is calculated. Further, the data glove is controlled to perform the shape change based on the calculation result so that the user experiences gripping the rope or the stick, which is different from the perception of making a fist. Further, the data glove is reversely controlled so that the user feels the experience of loosening the rope or stick.

Figure 8:
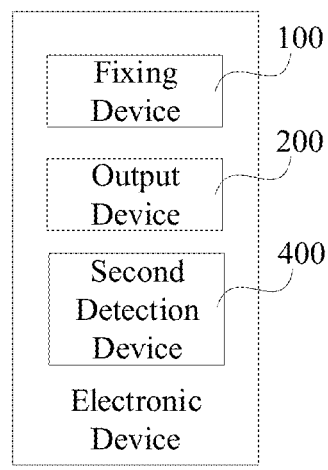
FIG. 8 illustrates a schematic diagram of another electronic device consistent with the disclosed embodiments.

Based on this, as shown in FIG. 8, the electronic device may also comprise a second detection device 400, used to detect that, after the electronic device is worn by the user, the current state of the output device 200 satisfies a locking condition, and to lock the output device to prevent the shape change from the position corresponding to the current state towards the other position.

The above locking condition may be determined according to the current state information of the user in the virtual scene. For example, by using the image collection and analysis method to determine that the user successfully picks up or lifts an object such as a wooden stick or a water cup, the current state may be considered to satisfy the locking condition.

Optionally, the locking condition may also be determined by judging the deformation position of the output device and calculating the obtained fixed position. For example, the output device performs the shape change from the first fixed position to the second fixed position, and reaches a second fixed position. At this time, the current state of the output device may be considered to satisfy the locking condition, and the output device can be locked to prevent the shape change from continuing from the first fixed position to the second fixed position. It should be noted that the specific content of the locking condition is not limited herein.

Figure 9A:
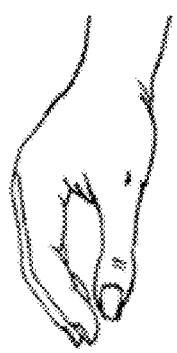
FIG. 9A and FIG. 9B illustrate structural diagrams of the output device of an electronic device in different states consistent with the disclosed embodiments.
Figure 9B:
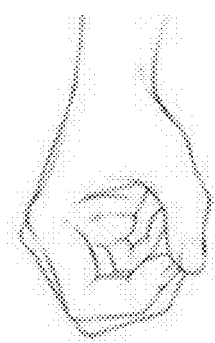

Using the data glove as an example, in the visual scene where the user grips a stick, the data glove can be changed from the first fixed position shown in FIG. 9A to the second fixed position shown in FIG. 9B. At this time, the data glove can be locked to maintain in the gripping state as shown in FIG. 9B so as to prevent the data glove from continuing to change the gripping state. That is, the data glove can no longer continue to grip any further after reaching the second fixed position shown in FIG. 9B, that is, the data glove is locked from continuing the shape change in the gripping direction. Alternatively, as described above, after it is determined by image analysis that the user successfully picks up the stick, the data glove can lock the output device to prevent the shape change in any direction whether or not the fixed position shown in FIG. 9B is reached.

The second fixed position of the output device described above may be calculated according to the current posture information of the user. Specifically, the second detecting device 400 may include a position tracker for acquiring posture information such as the positions of the fingers and the palms, the change data, and the like. Thus, the second fixed position and the first fixed position can be calculated. The calculation manner is not limited to this calculation type and the structure of the second detecting device 400 is not limited to the position tracker.

Optionally, according to the electronic device shown in FIG. 8, when the second detecting device 400 detects that the output device performs the shape change from the second fixed position to the first fixed position or, by image analysis, it is determined that the user wants to put down the stick, the locking of the output device described above can be released, such that the output device can perform the shape change in the direction to the first fixed position.

Specifically, using the data glove as an example, the data glove is locked to prevent the shape change from continuing from the first fixed position to the second fixed position. At this time, the shape change of the data glove can also be prevented from the second fixed position to the first fixed position so as to maintain the stability of the electronic device in the locked state.

Further, a trigger condition for unlocking the electronic device from the locked state may be set. For example, the trigger condition may include when the shape change is detected in the opposite direction of the direction of preventing from continuing the shape change (i.e., the direction from the first fixed position to the second fixed position), that is, the direction from the second fixed position to the first fixed position. Or the trigger condition may include when it is determined by image analysis that the user performs an opposite action (i.e., the opposite action of the pick-up action described above is a drop action, which may be determined based on the specific scene). Further, according to the trigger condition, (that is,) or the locked state of the electronic device can be unlocked, so that the output device can perform the shape change in the opposite direction. After the shape change occurs in the opposite direction, the output device can still perform the shape change from current position to the second fixed position. When the second fixed position is reached, the control of the output device can still be realized according to the manner described above.

Optionally, in one embodiment, when the locking described above is released, the output device may automatically restore to the first fixed position, or may perform the shape change from the second fixed position to the first fixed position to reach an arbitrary position in the middle, which is not limited herein.

Further, when the output device reaches the first fixed position, the output device may be locked to prevent the shape change from continuing from the second fixed position to the first fixed position according to the locking and unlocking control manners described above. According to the above actions, the output device can be detected to perform the shape change from the first fixed position to the second fixed position to unlock the locking of the output device. Afterwards, the output device can perform the shape change in the direction of the second fixed position.

Using the data glove as an example, when the data glove performs the shape change to the stretched state shown in FIG. 9A corresponding to the first fixed position, or when the shape change reaches the gripping state shown in FIG. 9B corresponding to the second fixed position, the same state can be maintained at this time. As described above, the output device can be locked to ensure the shape stability of the data glove when the user performs subsequent actions. Of course, when the trigger condition for unlocking the locked state of the output device is detected, the locking may be unlocked so that the data glove can perform the shape change in the opposite direction without affecting the haptic feedback of other gestures.

For the locking of the data glove, a structural component capable of spatial deformation may be disposed in advance at the finger joint of the data glove, such as an airbag. After it is confirmed that the current state of the output device satisfies the locking condition, the airbag may be controlled to inflate to prevent the output device from continuing the shape change and to maintain the locked state. After the current state of the output device satisfies the unlocking condition, the airbag may be controlled to deflate to unlock the locked state of the output device. It should be noted that the inflation/deflation control of the airbag may be performed when the current state of the output device satisfies the locked state/unlocking condition, or may be performed during the shape change process of the output device. For example, when the data glove performs a gripping action, a gap is generated at the finger joint, and the airbag inflation/deflation may be controlled as the gap changes.

Optionally, in one embodiment, a friction-adjustable rotating shaft may be set at the finger joint(s) of the data glove. With the gripping action of data glove, the friction of the rotating shaft can be increased, so that the shape change can no longer be continued after the output device reaches the second fixed position.

It should be noted that the implementation method of locking the output device is not limited to the two manners described above. Moreover, the trigger conditions of the locking and the unlocking operations of the output device described above are not limited to the image analysis results described above. The specific fixed positions reached by the shape change of the output device can be set according to actual requirements.

Optionally, when the output device 200 reaches the second fixed position to generate a fixed shape, the change of the mechanical structure of the output device may be utilized to lock the output device so as to prevent the shape change from continuing from the first fixed position to the second fixed position. And the shape change from the second fixed position to the first fixed position is not prevented.

In practical applications, the output device 200 can be set with a structural component such as a limit bracket. The unidirectional blocking of shape change of the output device can be realized by using the mechanical characteristics of the structural component itself. Specifically, during the process of shape change of the output device, the structural component can be changed as the mechanical structure changes. When the structural component is deformed to a certain fixed shape, it can perform a limiting function. That is, the output device is prevented from continuing to perform the shape change along the deformation direction. Alternatively, in one embodiment, the structural components may also be set in the first fixed position and the second fixed position of the output device. When the output device reaches the first fixed position or the second fixed position, the structural component may be moved to the position where it can function as a limiting device due to the structural change, thereby preventing the output device from continuing the shape change and the like. The mechanical structure of the limit bracket of the output device is not limited herein.

Using the data glove described above an example, a rotating shaft of a particular shape with a limit protrusion may be set in the finger joint (a gap in the finger joint) of the data glove. Fingers of the data glove keep approaching the limit protrusion when the data glove performs the gripping action until the position of the limit protrusion is reached. Then the grip may no longer be continued, but the data glove may be released. That is, fingers of the data glove can move in the opposite direction.

Optionally, a fixed-shaped support component may be set in the fingertip position of the data glove. One end of the support component can be fixed in the fingertip position, and the other end can be detachably connected with a preset position below the finger. When the finger bends, the support component can be detached from the preset position and form a certain angle with the finger. Accordingly, as the finger bends, one end of the support component may be pushed up to the fingertip position, and the other end may gradually approach the palm position. When the support component reaches the palm position, the data glove is prevented from continuing to grip. It should be noted that the structural components provided by the embodiment are not limited to the two structures described above.

It should be noted that, when the electronic device is of other types, such as a helmet-like electronic device, it can also use the manner described above to control the shape change, so that the user feels the change in space.

Figure 10:
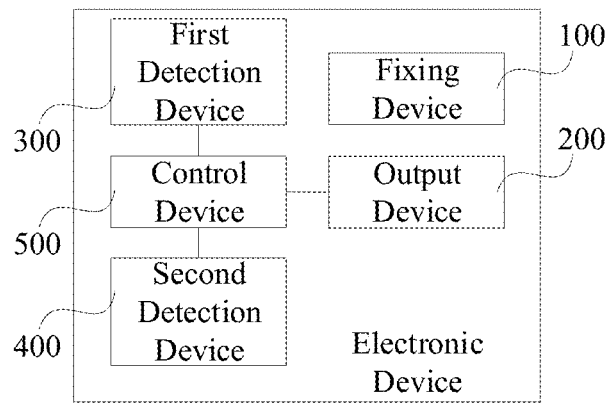
FIG. 10 illustrates a schematic diagram of the structure of another electronic device consistent with the disclosed embodiments.

Optionally, based on the various foregoing embodiments shown in FIG. 10, the electronic device in one embodiment may also comprise a control device 500 used to obtain the state information of the user in a virtual scene when the user wears an electronic device. Based on the state information, the control device 500 generates the control command for the at least one body part where the user may obtain the haptic feedback.

Thus, the state information of the user in the virtual scene may be detected by the first detection device and the second detection device. In combination with the description of scenario in the foregoing embodiments, the state information may include action information, posture information, attribute information and the like. The content included in the state information is not limited herein.

Accordingly, after the detection device detects the corresponding state information and sends it to the control device, the control device may calculate the required parameters such as the fixed positions of the foregoing output device that performs shape change according to the state information. The specific calculation method is not limited. Further, the corresponding control command based on the calculation result is generated and sent to the output device so as to control the corresponding haptic component to perform the corresponding operation. Alternatively, the output device is directly controlled to perform shape change according to the control command. For details, referring to the structure of the output device and the function implementation thereof described in the foregoing embodiments.

Accordingly, after the electronic device is worn by the user, the relative positional relationship between the electronic device and the at least one part of the user's body is maintained by the fixing device of the electronic device. When the control command is obtained, the output device of the electronic device responds to the control command and performs an operation causing the user to obtain the haptic feedback. Thus, in a virtual scene created by the electronic device, the user may not only visually see the virtual scene, but also perceive the haptic feedback that the virtual character should obtain in the virtual scene, such as temperature, pain, pressure space, and the like. The electronic device makes the user's perception of the virtual scene more abundant, improves the user's reflection speed in the virtual scene, and further improves the user's immersion in the virtual scene.

It should be noted that, for the electronic device of various configurations described above, the operation performed by the output device causing the user to obtain the haptic feedback may be based on the operation of the user on an electronic device. Thus, the user interacts with the virtual characters in the virtual scene so as to obtain a corresponding control command, thereby making the output device to perform an operation causing the user to obtain corresponding haptic feedback.

Certainly, the control command that the output device responds to may be actively generated by the electronic device. In this case, the haptic feedback obtained by the user may be used as the prompt information to prompt the user to view the virtual scene in the preset direction; or to prompt the user to perform the corresponding actions; or prompt the user for the specific state of the current virtual scene and the like. In the embodiment, the generation manner of the control command in response to the output device and the role played by the user in obtaining the haptic feedback are not limited, which may be determined according to actual requirements.

Figure 11:
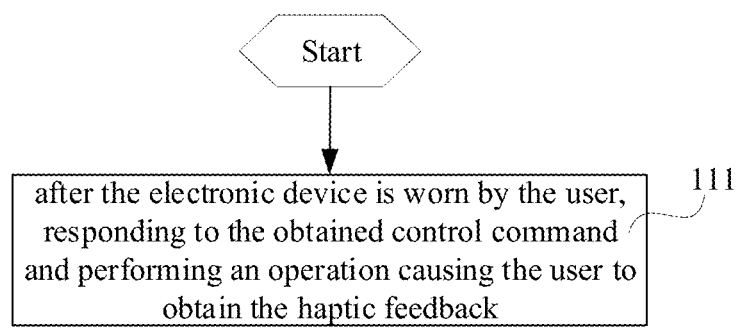
FIG. 11 illustrates a flow chart of a control method consistent with the disclosed embodiments.

The flow chart of a control method disclosed in one embodiment is shown in FIG. 11. The method is applicable to various electronic devices described in the foregoing embodiments. Specifically, the method may include the followings:

S111: after the electronic device is worn by the user, responding to the obtained control command and performing an operation causing the user to obtain the haptic feedback.

Optionally, the control command may be generated by the electronic device according to the detected information, or may be sent to the electronic device by an external device, or may be generated actively by the electronic device. The generation manner of the control command is not limited herein.

In combination with the foregoing embodiments of various electronic devices, due to the different configurations of the output devices of the electronic device, the haptic feedback obtained by the user is different when the output device responds to the control command. The specific details can be referred to the description of the foregoing embodiments.

Figure 12:
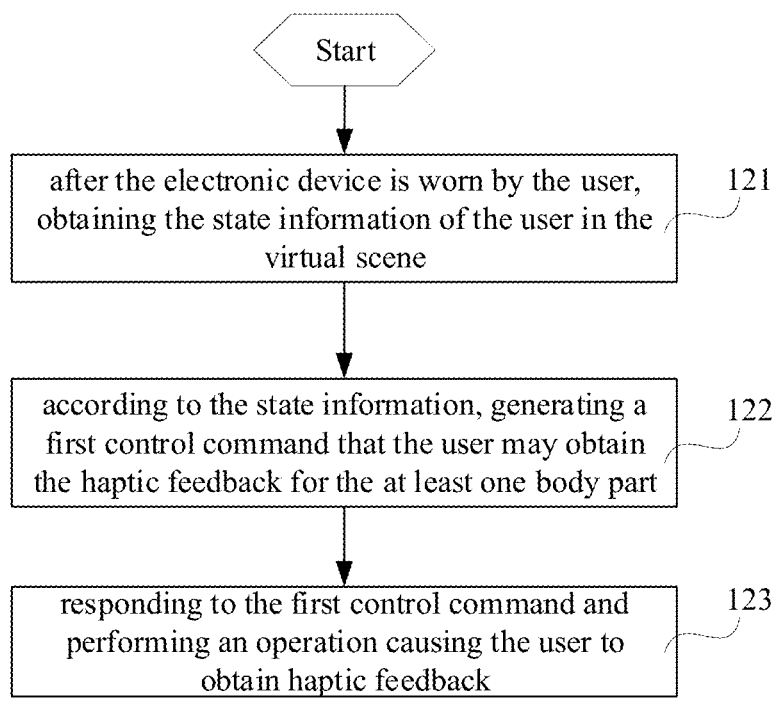
FIG. 12 illustrates a flow chart of another control method consistent with the disclosed embodiments.

Optionally, the flow chart of another control method disclosed in one embodiment is shown in FIG. 12. The method may include the followings:

S121: after the electronic device is worn by the user, obtaining the state information of the user in the virtual scene.

The content of the state information is not limited herein. It may include motion information of the user and scene information of the virtual scene, which may indicate that the virtual scene is a snow scene, a fighting game scene, a rainy scene and the like. The state information may also include the attribute information, the motion information, and the like, of other virtual objects in the virtual scene.

S122: according to the state information, generating a first control command for the at least one body part where the user may obtain the haptic feedback.

Since the user may perform the same action in different virtual scenes, the haptic feedback obtained by the user is usually different due to the different specific virtual scenes. Therefore, in one embodiment, the haptic feedback that the user is about to obtain is determined according to the obtained state information. The information such as the body part and the like of the user who obtains haptic feedback is calculated. Then a first control command that includes the information is generated so as to ensure that the output device of the electronic device may thereby cause the user to obtain body feelings, which are consistent with the experience that the user's virtual characters may have in the virtual scene.

Optionally, the state information described above may include image information of the current virtual scene. By performing image analysis on the image, it can be determined that the current user completes the current action, and a corresponding first control command is generated, such as determining that the user holds the water cup, generating a first control command, and locking the output device.

It should be noted that the specific implementation method of S122 is not limited herein.

S123: responding to the first control command and performing an operation causing the user to obtain the haptic feedback.

In combination with the descriptions of various electronic devices described in the foregoing embodiments, the user obtains different haptic feedback. The haptic components of the electronic device in response to the first control command may be different. For the same haptic feedback, it can be realized by output devices with different structures, which greatly improves the flexibility and diversity of the control method. For the specific implementation of the operation performed by the electronic device, reference may be made to the description of various foregoing embodiments.

Figure 13:
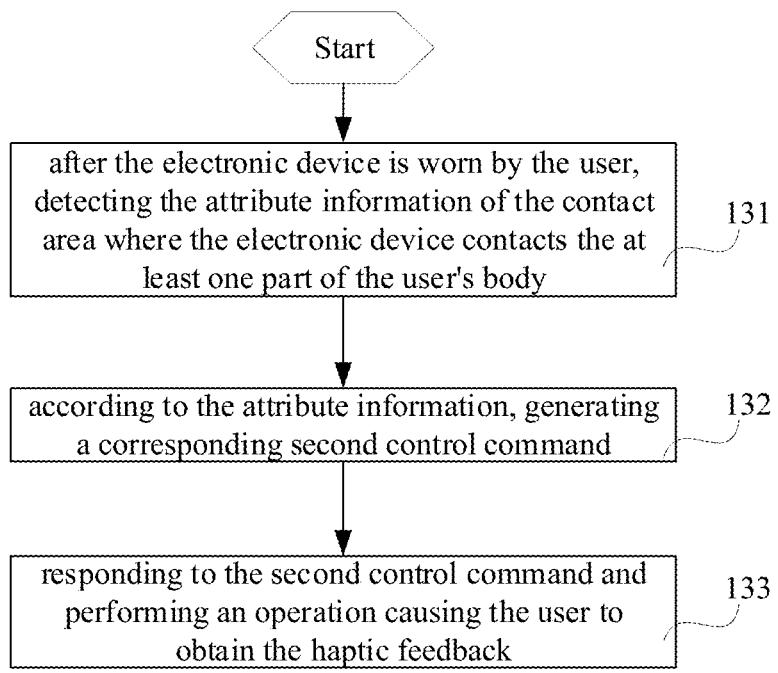
FIG. 13 illustrates a flow chart of another control method consistent with the disclosed embodiments.

Optionally, the flow chart of another control method disclosed in one embodiment is shown in FIG. 13. The method may include the followings:

S131: after the electronic device is worn by the user, detecting the attribute information of the contact area where the electronic device contacts the at least one part of the user's body.

The attribute information may indicate that the contact area is a hair-covered area, a bare skin area, a clothing coverage area and the like, so that the output device adjusts the control parameters accordingly to make the body sense of each area is the same.

S132: according to the attribute information, generating a corresponding second control command.

The second control command is used to indicate the electronic device to perform an operation causing the user to obtain non-moving or vibration haptic feedback. For details, referring to the description of the corresponding embodiments of the electronic devices described above.

S133: responding to the second control command and performing an operation causing the user to obtain the haptic feedback.

Optionally, in one embodiment, it may also detect the current posture information of the user, and generate a corresponding third control command according to the current posture information. The third control command may be used to indicate the electronic device to perform an operation causing the user to obtain the spatial haptic feedback. The specific implementation method of the third control command is not limited herein.

Accordingly, after the electronic device is worn by the user to output a virtual scene, based on the interaction of the user in the virtual scene, the electronic device may not only control the corresponding change of the virtual scene, which is visually experienced by the user, but also cause the user's corresponding body part to obtain the corresponding haptic feedback through the output device such as temperature, pain, pressure, space and the like. Thus, the user may experience the virtual scene and its change from haptic perception, thereby making the output format of the electronic device flexible and enriching the user's body sensation. It can also help the user to quickly make action feedback on the change of the virtual scene, thereby greatly improving the user's immersion in the virtual scene.

The embodiments described above disclose an electronic device and control method thereof. When the user wears an electronic device, an output device may perform an operation causing the user to obtain the haptic feedback, so that the output format of a virtual scene to the user is more abundant. The user can also feedback on current virtual scene timely and accurately, thereby further improves the user's immersion in the virtual scene.

Finally, it should be noted that, with respect to each of the foregoing embodiments, the terms "including", "comprising", or any other variation thereof are intended to cover a non-exclusive inclusion, such that a process, method or system that comprises a list of elements includes not only those elements, but also other elements not explicitly listed or inherent to such process, method or system. An element defined by the phrase "comprising a . . . " without further limitation does not exclude the presence of additional identical elements in the process, method or system that includes the element.

The various embodiments in this specification are described in a progressive manner, and each embodiment focuses on differences from other embodiments. The same or similar parts between the various embodiments may be referred to each other. For the methods disclosed in the embodiments, since they are implemented based on the electronic device disclosed in the embodiments, the description is relatively simple, the relevant parts can be referred to the description of the electronic device.

The above description of the disclosed embodiments enables those skilled in the art to realize or use the present disclosure. Various modifications to these embodiments may be readily apparent to those skilled in the art and the generic principles defined herein may be applied to other embodiments without departing from the spirit or scope of the disclosure. Therefore, the present disclosure is not intended to be limited to the embodiments shown herein, but is to be accorded the widest scope consistent with the principles and novel features disclosed herein.

What is claimed is:

1. An electronic device to be worn by a user, comprising:
a fixing device for, after the electronic device is worn by the user, maintaining a relative positional relationship between the electronic device and at least one part of the user's body;
an output device for, after the electronic device is worn by the user, responding to an obtained control command and performing an operation causing the user to receive haptic feedback from the electronic device based on the relative positional relationship, and performing a shape change between a first fixed position and a second fixed position, the output device including at least one haptic component capable of giving the haptic feedback to the user's body;
a first detecting device for, detecting attribute information of a contact area where the at least one haptic component contacts the user's body to determine an area type of the contact area from a plurality of area types, the plurality of area types including a bare skin area, a hair area, a clothing covering area,
wherein:
in response to determining that the area type of the contact area is a first area type of the plurality of area types, the at least one haptic component is configured with a first set of control parameters for the haptic feedback; and
in response to determining that the area type of the contact area is a second area type of the plurality of area types that is different from the first area type, the at least one haptic component is configured with a second set of control parameters for the haptic feedback, the second set of control parameters being different from the first set of control parameters; and
a second detecting device for, in a process where the output device changes shape from the first fixed position to the second fixed position, detecting, according to a current state information of the user in a virtual scene, whether a current state of the output device satisfies a locking condition, and in response to the current state of the output device satisfying the locking condition, locking the output device in the second fixed position, such that the output device stops changing shape beyond the second fixed position and starts to change shape reversely toward the first fixed position.

2. The electronic device according to claim 1, wherein the at least one haptic component includes at least one type of haptic components capable of giving haptic feedback to a plurality of the user's body positions.

3. The electronic device according to claim 2, wherein the at least one type of haptic components comprises one or more of:
multiple first haptic components disposed at different positions;
a second haptic component capable of moving relative to the at least one part of the user's body;
a third haptic component providing the haptic feedback to the user's corresponding body position while moving relative to the at least one part of the user's body; and
multiple fourth haptic components capable of causing the user to obtain the haptic feedback from different body positions in sequence according to acquired preset rules, the multiple fourth haptic components being of a same type.

4. The electronic device according to claim 1, wherein:
the output device comprises at least one fifth haptic component causing the user to obtain non-moving or vibration haptic feedback; and
the attribute information indicates the control command obtained by the output device for the fifth haptic component at a corresponding position.

5. The electronic device according to claim 1, wherein the output device has at least one preset shape and, after the electronic device is worn by the user, the output device in the preset shape causes the user to obtain spatial haptic feedback.

6. The electronic device according to claim 5, wherein the output device has at least one fixed shape obtained by an initial shape change of the output device.

7. The electronic device according to claim 1, further comprising:
a control device for, after the electronic device is worn by the user, obtaining the state information of the user in the virtual scene, and generating the control command according to the state information.

8. The electronic device according to claim 1, wherein the control parameters include a strength, an amplitude, and an angle of the haptic feedback on the contact area.

9. The electronic device according to claim 1, wherein:
the first detecting device includes a photodetector configured to emit light to the contact area and detect parameters of light reflected by the contact area; and
the first detecting device determines the area type of the contact area from the plurality of area types based on the detected parameters of the light reflected by the contact area.

10. A control method for controlling an electronic device worn by a user, comprising:
after the electronic device is worn by the user, maintaining, by a fixing device of the electronic device, a relative positional relationship between the electronic device and at least one part of the user's body;
after the electronic device is worn by the user, responding, by an output device of the electronic device, to an obtained control command and performing an operation causing the user to receive haptic feedback from the electronic device based on the relative positional relationship, and preforming, by the output device, a shape change between a first fixed position and a second fixed position, the output device including at least one haptic component capable of giving the haptic feedback to the user's body;
detecting, by a first detecting device of the electronic device, attribute information of a contact area where the at least one haptic component contacts the user's body to determine an area type of the contact area from a plurality of area types, the plurality of area types including a bare skin area, a hair area, a clothing covering area;
configuring, by the output device and in response to determining that the area type of the contact area is a first area type of the plurality of area types, the at least one haptic component with a first set of control parameters for the haptic feedback;
configuring, by the output device and in response to determining that the area type of the contact area is a second area type of the plurality of area types that is different from the first area type, the at least one haptic component with a second set of control parameters for the haptic feedback, the second set of control parameters being different from the first set of control parameters; and
detecting, by a second detecting device for the electronic device, in a process where the output device changes shape from the first fixed position to the second fixed position, according to a current state information of the user in a virtual scene, whether a current state of the output device satisfies a locking condition, and in response to the current state of the output device satisfying the locking condition, locking the output device in the second fixed position, such that the output device stops changing shape beyond the second fixed position and starts to change shape reversely toward the first fixed position.

11. The control method according to claim 10, wherein the at least one haptic component includes at least one type of haptic components capable of giving haptic feedback to a plurality of the user's body positions.

12. The control method according to claim 11, wherein the at least one type of haptic components comprises one or more of:
multiple first haptic components disposed at different positions;
a second haptic component capable of moving relative to the at least one part of the user's body;
a third haptic component providing the haptic feedback to the user's corresponding body position while moving relative to the at least one part of the user's body; and
multiple fourth haptic components capable of causing the user to obtain the haptic feedback from different body positions in sequence according to acquired preset rules, the multiple fourth haptic components being of a same type.

13. The control method according to claim 10, wherein:
the output device comprises at least one fifth haptic component causing the user to obtain non-moving or vibration haptic feedback; and
the attribute information indicates the control command obtained by the output device for the fifth haptic component at a corresponding position.

14. The control method according to claim 10, wherein the output device has at least one preset shape and, after the electronic device is worn by the user, the output device in the preset shape causes the user to obtain spatial haptic feedback.

15. The control method according to claim 14, wherein the output device has at least one fixed shape obtained by an initial shape change of the output device.

16. The control method according to claim 10, wherein the electronic device further comprises a control device, and the method further comprises:
  after the electronic device is worn by the user, obtaining, by the control device, the state information of the user in the virtual scene, and generating the control command according to the state information.

* * * * *